G. E. HAYES.
Vulcanizing Apparatus.
No. 31,599.
Patented March 5, 1861.
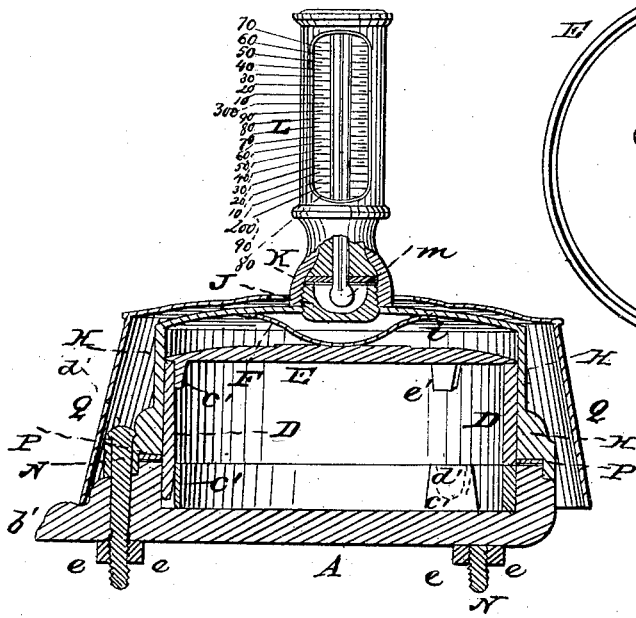
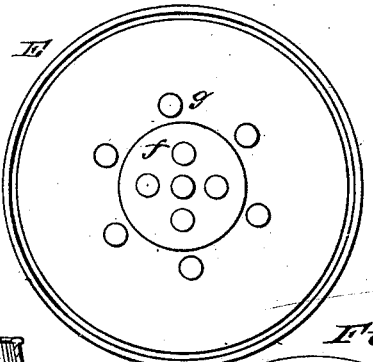
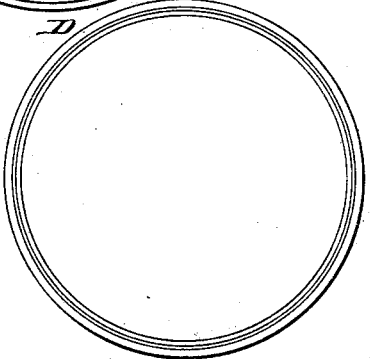
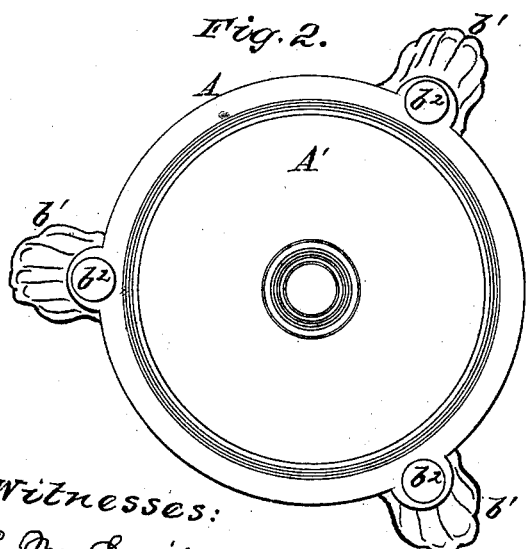
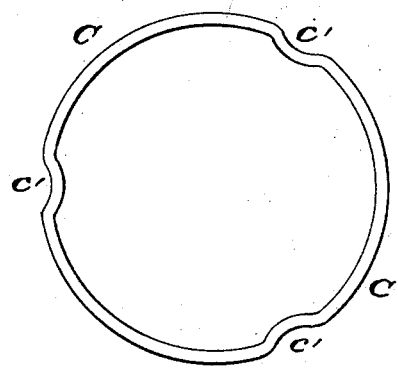
Witnesses:
E. M. Davis
G. B. Forbush
Inventor:
Geo. E. Hayes

UNITED STATES PATENT OFFICE.

GEORGE E. HAYES, OF BUFFALO, NEW YORK.

APPARATUS FOR VULCANIZING CAOUTCHOUC.

Specification forming part of Letters Patent No. 31,599, dated March 5, 1861; Reissued September 29, 1868, No. 3,140.

*To all whom it may concern:*

Be it known that I, GEORGE E. HAYES, of the city of Buffalo and State of New York, have invented new and useful improvements in the construction and use of vulcanizing vessels, for vulcanizing rubber compound and other vulcanizable gums and compounds for artificial teeth and other purposes; and I do hereby declare that the following is a full and exact description of the construction and operation of the same, reference being had to the accompanying drawings, making a part of this specification, in which—

Figure I, is a vertical section of my improved vulcanizing vessel. Fig. II, is a plan of the bottom or lower section thereof. Fig. III, is a plan of the middle section or band which surrounds the plaster mold. Fig. IV, is a plan of the top, or cover to the middle section. Fig. V, is a plan of an open ring, which sits within the lower section.

The nature of my invention consists, 1st, in so constructing and using a vulcanizing vessel, as that the plaster mold, containing the rubber compound shall lie upon the bottom of the vessel and the heat from the lamp or other heating body shall be applied directly to the bottom of the vessel upon which the mold lies, thereby securing a close proximity of the mold and rubber compound with the heated vessel, which construction and use enables me to dispense with water within the vulcanizing vessel as a heating medium, as heretofore used, other than that in combination with the plaster mold, and also allows the vulcanizing process to be completed with a less quantity of heat than heretofore; 2d, in the construction and use of a mercury chamber, in which to place the bulb of the thermometer, so that the degrees of heat may be correctly indicated without incurring the danger and inconvenience of placing the bulb within a steam chamber, as has been the practice heretofore; 3d, in the use of an open ring in connection with the vulcanizing vessel, for the purpose of facilitating the removal of the plaster from the vulcanizing vessel, the plaster being allowed to come in direct contact with the bottom of the vessel, during the vulcanizing process, and in the arrangement of a spring therewith.

Having reference to the drawings, A, (Figs. I, and II,) represents the bottom or lower section. It is made of cast iron, of a circular form, about four and a quarter inches in diameter, and so constructed as to form a circular basin $A^1$, about half an inch in depth, the metal being about three eighths of an inch in thickness, more or less. It has three legs or feet ($b^1$,) with holes ($b^2$,) therein, through which to pass the bolts from the upper section.

(C, Fig. V,) is an open ring of cast iron, about half an inch in width, and of such diameter, as will allow it to set within the basin already described. It has three slight depressions or recesses as shown at ($c^1$) to admit the lugs projecting from the edge of the band D.

D, Fig. III, is a band of cast iron about one inch in width, and of equal, (or nearly so), diameter with the basin (A), formed in the lower section, as already described. It has three projecting lugs $d^1$, which pass into the depressions, $c^1$, as shown in Fig. I.

E, Fig. IV, is the top plate or cover, of cast iron, which fits over the band, D; it has three projecting nibs, which pass inside of the band D, two of which are shown at $e^1$, Fig. I. It has a slight circular emboss upon its upper face, as shown at $f$, with several countersinks as shown at ($g$).

H, Fig. I, is the upper, or inclosing section. It is made of copper, or brass, or other suitable metal, and has a diameter a little larger than the band, D, and a depth which exceeds the width of the band, D, with the cover E, thereon, so that it may inclose these parts, leaving sufficient room for a spring F, to press upon the cover as shown in the drawing. One end of the spring is made fast to the upper part of the section upon the inside, as shown at $i$, while the other end is left free,—the middle of the spring pressing upon the cover. The object of this spring is to hold the parts C, D, and E, (with the mold) securely in their place during the vulcanizing process. A knob or protuberance J, is formed on the upper part of this section, in which is formed the mercury chamber K. A screw thread is cut on the outside of this knob, so that the thermometer L may be screwed thereon, and allow the bulb ($m$), to hang in the chamber, in mercury, or other fluid, as shown in the drawing. This arrangement enables me to use the thermometer entirely separate from a steam chamber. It also enables me to use a thermometer more safely and conveniently, than where it is connected with the steam chamber. It can be removed and laid by, in a safe place, when not in use. Bolts N, are connected with this section (H) which pass through the holes $b^1$, in the bottom, with nuts, $e$, to hold the two parts firmly secured together. Rubber packing, P, is used between the two parts so that no steam or water can escape from the mold while the vulcanizing process is going on.

Q, is a jacket of galvanized iron, which sets over the upper section, resting upon the bottom section as represented.

To use my vulcanizing vessel, I first place the narrow ring $c$, within the basin $A^1$. The (mold) is placed in this ring, lying upon the bottom of the basin $A^1$, and the interstices filled with plaster even with the top of the ring. The wide band D, is then properly placed, and filled with plaster, to form the upper section of the mold. The mold being ready, the rubber compound is introduced in the ordinary way. The upper section, H, is then secured to the bottom or lower section, by means of the bolts, and nuts, before described, the spring F, resting upon the cover, E. Heat is then applied to the lower section or bottom of the vessel, till the thermometer marks a degree, somewhere from 300° to 330°. If kept at about the latter temperature, forty five minutes, the rubber should be perfectly vulcanized. When done, the whole may be doused into water, and the bolts unscrewed.

I claim—

1. So constructing and using a vulcanizing vessel with a flattened bottom as that the plaster mold containing the rubber compound, shall lie in contact with the inside of the vessel, so that the heat from the lamp or other heating body, shall be applied directly to that part of the vessel, upon which the mold lies, for the purposes, and substantially as set forth.

2. A mercury chamber formed in the upper section, the same being constructed and arranged with the thermometer, substantially as set forth.

3. The open ring $c$, in combination with the bottom A,—band D, and cover E, substantially as described.

GEO. E. HAYES.

Witnesses:
E. B. FORBUSH,
E. M. DAVIS.